Oct. 6, 1942.  J. H. RAND, JR., ET AL  2,297,915
ELECTRIC RAZOR
Filed July 19, 1938  2 Sheets-Sheet 1
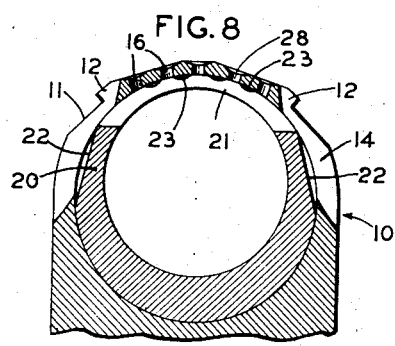
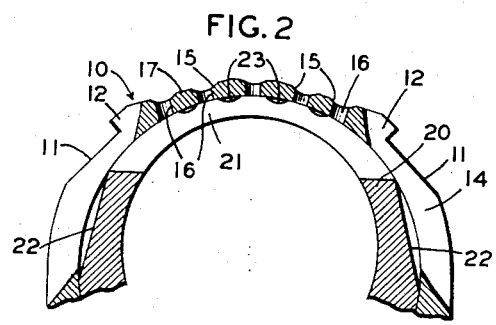
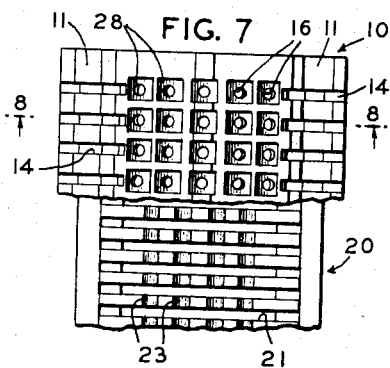
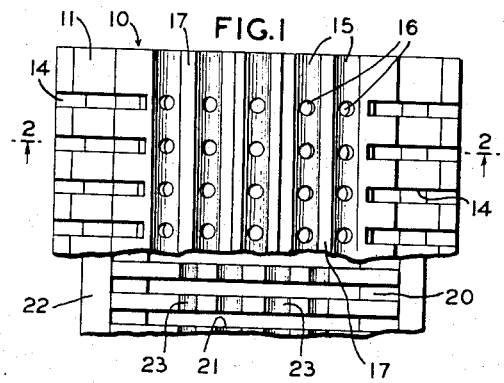
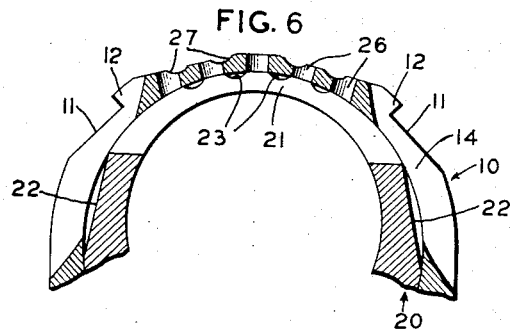
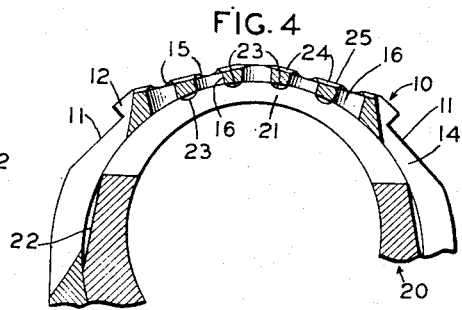
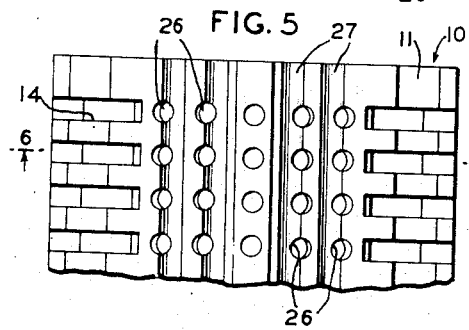
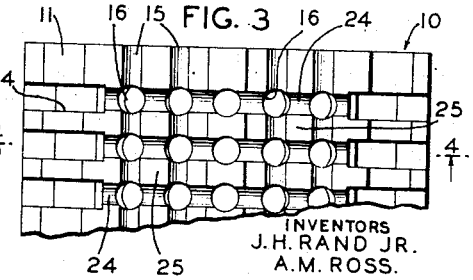
INVENTORS
J. H. RAND JR.
A. M. ROSS.
BY W. A. Spark
ATTORNEY Oct. 6, 1942.     J. H. RAND, JR., ET AL     2,297,915
ELECTRIC RAZOR
Filed July 19, 1938     2 Sheets-Sheet 2

Inventor
J. H. RAND JR.
A. M. ROSS

Patented Oct. 6, 1942

2,297,915

UNITED STATES PATENT OFFICE 2,297,915

ELECTRIC RAZOR

James Henry Rand, Jr., Stamford, Conn., and Albert Miller Ross, Garden City, N. Y., assignors to Remington Rand Inc., Buffalo, N. Y., a corporation of Delaware Application July 19, 1938, Serial No. 220,098

5 Claims. (Cl. 30—43)

This invention relates to improvements in shearing heads for dry shavers, and more particularly to the arrangement and formation of the shearing members.

It is a well known fact that razors of the type known as dry shavers have one inherent fault, namely, that they are unable to cut the beard close to the skin. This is due to the fact that the metal of the outer member of the shearing head must be of sufficient thickness to protect the skin from being chafed by the rapidly moving inner cutter. It is obvious, therefore, that if the outer cutter has an appreciable thickness, the hair can only be cut to a length equal to that thickness.

It is, therefore, the principal object of this invention to provide a shearing head wherein the metal adjoining the shear members has been reduced to a minimum thickness, thereby permitting the hair to be cut closer to the skin.

Another object is to provide a shearing head, the outer cutter of which has means thereon for stretching the skin so that the hair is elevated to a position in which it may be easily cut close to the skin.

A still further object is to provide a shearing head in which the shearing members of the outer cutter are made as thin as possible, without reducing the strength and rigidity of the head.

Another object is to provide an inner cutting member of a shearing head in which friction is reduced to a minimum, without interfering with the cutting action.

A more clear conception of the construction operation and further objects of the invention may be had from the following specification taken in conjunction with the accompanying drawings, in which Fig. 1 is a partial top plan view of the preferred form of shearing head in which the outer cutter is provided with longitudinal grooves and is broken away to show the inner cutter;

Fig. 2 is a cross section taken along line 2—2 of Fig. 1;

Fig. 3 is a partial plan view of a modified form of outer cutter wherein transverse as well as longitudinal grooves are provided;

Fig. 4 is a cross section taken along line 4—4 of Fig. 3;

Fig. 5 is a partial plan view of a further modified form of outer cutter in which perforations are located in the edges of the grooves;

Fig. 6 is a cross section taken along line 6—6 of Fig. 5;

Fig. 7 is a partial plan view of another modification of the outer cutter in which the surface is ground away to form a depression around each perforation;

Fig. 8 is a cross section taken along line 8—8 of Fig. 7;

Figure 9:
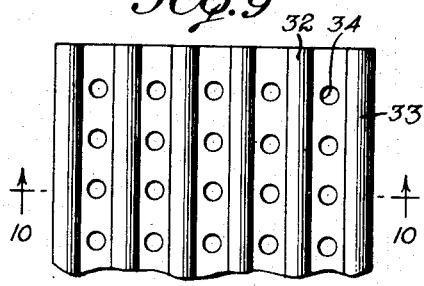
Fig. 9 is a partial top plan view of another modification of the outer cutter having the ribs running longitudinal instead of transverse.

The shearing head disclosed herein is adapted to be removably secured in a razor similar to that disclosed and described in the Patent No. 2,134,134, issued October 25, 1937, to H. Landsiedel, and comprises an outer cutter 10 which is secured to a motor casing or handle (not shown). The inner cutter 20 is adapted to be reciprocated in the outer cutter by any well known means driven by a suitable motor, as disclosed in the above mentioned patent.

Referring to the drawings, the outer cutter 10 is shown substantially U-shaped having a central shaving section and side sections on opposite sides, a circular bore or channel between said side sections in which is positioned the inner cutter 20 to engage the inner face of the shaving section. The upper portion of the outer cutter forming the shaving section is ground to form two flat surfaces at a slight angle from the horizontal. At each side of the cutter two flat surfaces 11 are ground which form combing teeth 12. In the portion of the cutter at teeth 12, and extending down the side thereof, are slots 14 which extend into the bore of the cutter.

Along the center line of the cutter and equidistant therefrom, a series of longitudinal arcuate grooves 15 are cut in said shaving section to provide a corrugated outer surface thereon. Disposed in the bottom of grooves 15 is a line of perforations 16, the edges of which form shearing members with the surface of the inner cutter. Between the grooves, the remaining metal forms ridges 17 which tend to reinforce the cutter. This corrugated outer surface of the shaving section provides a varying cross section of the outer cutter throughout each of the cutting edges.

As shown in Fig. 2 the grooves 15 reduce the metal of the cutter, and by locating the perforations 16 in the bottom of the groove, the shearing members are thus made as thin as possible without weakening the cutter.

The inner cutter 20 is substantially circular in shape having an eccentric bore therein forming a tubular structure. At the point where the metal is the thinnest slots 21 are cut which extend at right angles to the longitudinal axis of the cutter, these slots forming cutter bars with shearing edges contacting the inner surface of the outer cutter. These cutter bars and shearing edges extend uninterruptedly across the shaving section so that each cutting edge will have cutting cooperation in the reciprocation of the inner cutter with any of the cutting edges adjacent thereto between the opposite sides of the shaving section. The areas on each side of the slots 21 are ground flat at 22 (Fig. 2) to reduce the amount of bearing surface between the cutters, thus reducing friction and also insuring that the shearing edges of the inner cutter will be brought into perfect engagement with the shearing edges of the outer cutter.

At the points where the inner cutter contacts the inner surface of the ridges 17, longitudinal grooves 23 are cut. These grooves are ineffective portions of the bars formed by slots 21 and, therefore, are not essential to the shearing action of the cutter. It is obvious that the removal of this metal reduces the bearing surface of the inner cutter, thereby further reducing friction without in any way effecting the shearing or weakening the cutter.

When it is desired to cut long hair, the comb points 12 are brought into engagement with the skin, and the hair is combed into the slots 14 and 21 where it is sheared off.

To remove short hair the top portion is brought into engagement with the skin. As the razor is moved over the skin the grooves 15 cause the surface thereof to enter the grooves and be stretched by the ridges 17, thereby elevating the hair from the skin surface. The hair entering the perforations 16 passes into slots 21 where the shearing edges of both perforation and slot coact to cut the hair.

A modified form of outer cutter is shown in Figs. 3 and 4 wherein an additional set of transverse grooves 24 have been added, which form a blunt grill with square elevated surfaces 25 which tend to stretch the skin. The transverse grooves also give a combing action to the hair.

In Figs. 5 and 6 is disclosed a further modified form of shearing head in which the perforations 26 are formed in the outer edges (i. e., the edge away from the center of the head) of longitudinal grooves 27.

It is at this point that the skin is stretched to the best position to elevate the hairs, thereby insuring that they will enter the perforations to the greatest depth, thus permitting them to be cut close to the skin.

Figs. 7 and 8 show a further modified form of the outer cutter in which the metal adjoining the perforations 16 is ground away to form square indentations 28. These indentations have the same effect as grooves 15 and 24 with the exception that more metal is retained between perforations to provide reinforcing ribs, thereby forming a stronger and more rigid cutter.

It is obvious from the above that an outer cutter having grooves cut therein for reducing the thickness of the shearing edges, will provide a shearing head which is capable of cutting the hair close to the skin without burning or chafing.

Figure 10:
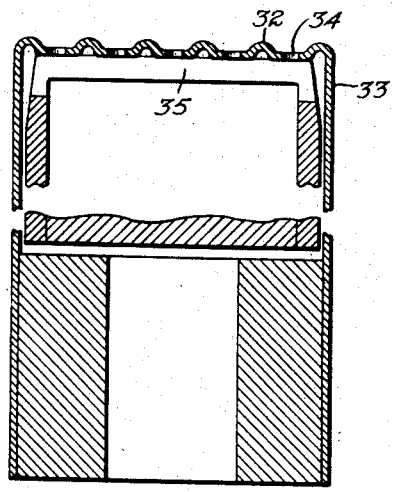
Fig. 10 is a cross section taken along line 10—10 of Fig. 9.

Figs. 9 and 10 show another modification very similar to the previous one, the only difference being that the ribs 32 are formed longitudinally on the plate 33 and not transversely. The perforations 34 are placed between the ribs as before and the same form of slotted inner cutter is used.

Figure 11:
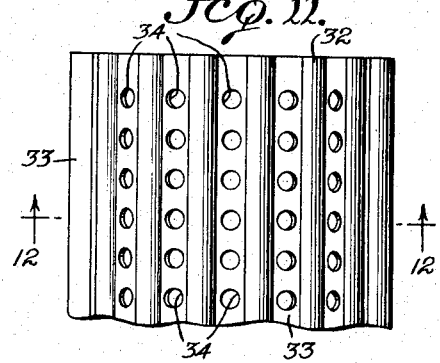
Fig. 11 is a partial top plan view of another modification of the outer cutter, similar to Fig. 9 except that the cutting surface is cylindrical instead of flat.
Figure 12:
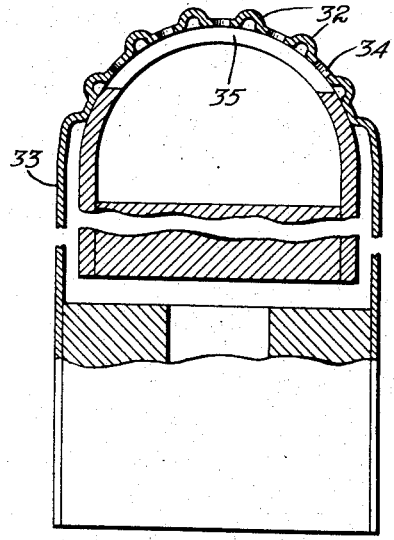
Fig. 12 is a cross section taken along line 12—12 of Fig. 11.

Figs. 11 and 12 show a form of outer cutter which is the same as that form shown in Figs. 9 and 10 except that the outer surface of both cutters is made with a cylindrical form. This also adds to the strength of the shear members and permits the use of very thin flat stock in their construction. The structural details and functional requirements of this design are similar to the previous modifications.

By corrugating the outer face of the shaver head in the manner above described and disclosed in the drawings in any of the several forms illustrated, it will be understood that the corrugations will cause the skin to be wrinkled as the shaver head is moved over the surface of the skin during the shaving operation. This wrinkling of the skin will cause the hair to rise up so that it may be picked up by the perforations in the shaver head for performing the shaving operation.

While we have described what we consider to be highly desirable embodiments of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. A shaver head comprising an outer cutter formed to provide a shaving section, side sections extending from opposite sides thereof and a channel between said side sections and the inner surface of said shaving section, an inner tubular cutter formed to provide a plurality of cutter bars with cutting edges having slidable bearing engagement on the inner surface of said shaving section, each cutter bar extending transversely across substantially the entire inner surface of said shaving section between said side sections, said shaving section having a plurality of spaced ribs extending continuously between opposite edges thereof and projecting outwardly from the outer face of said shaving section to form a corrugated outer face and a plurality of cutting edges at the inner surface of said shaving section and at the intersection of apertures therein opening through said outer corrugated face, said cutting edges of the outer and inner cutters having shaving cooperation in the reciprocation of said inner cutter and said corrugated outer face causing a plurality of wrinkles in the surface of the skin being shaved to project the bulging portions of the skin toward said cutting edges.

2. A shaver head comprising an outer cutter formed to provide a shaving section, side sections extending from opposite sides thereof and providing a channel at the inner surface of said shaving section and extending uninterruptedly between said side sections, an inner tubular cutter having a portion of the outer surface in contact with the inner surface of said shaving section formed to provide a plurality of cutting edges extending transversely between said side sections for cutting cooperation with a plurality of cutting edges at the inner surface on said shaving section defining perforations extending through said shaving section to the outer surface thereof, said shaving section having a corrugated outer surface forming a plurality of spaced parallel longitudinal ribs and intervening grooves extending from end to end thereof.

3. A shaver head comprising an outer cutter formed to provide a partially cylindrical shaving section, side sections extending from opposite sides of said shaving section in spaced substantially parallel relation and cooperating with said shaving section to form an uninterrupted channel therebetween along the inner partially cylindrical surface of said shaving section, an inner cylindrical cutter formed to provide a plurality of spaced parallel cutter bars having cutting edges thereon, said inner cutter having the portion formed with the cutter bars slidably engaged with said inner surface, each cutter bar extending transversely across substantially the entire inner surface of said shaving section between said side sections, said shaving section being formed with a plurality of apertures forming cutting edges on said section at the inner surface for cutting cooperation with the cutting edges on said cutter bars in the reciprocation of said inner cutter, and said shaving section having the outer surface formed with a plurality of spaced longitudinally extending ribs extending continuously between opposite edges and projecting outwardly to form a corrugated outer face and provide said shaving section with portions of varying cross section throughout each cutting edge thereon.

4. A shaver head comprising an outer cutter formed to provide a shaving section and side sections extending from opposite sides of said shaving section, said shaving section having a plurality of groups of spaced longitudinally extending rows of openings formed therein extending from the outer to the inner faces of said section, said shaving section having a smooth unobstructed inner face forming cutting edges at the intersection of said inner face with said openings, said shaving section being formed to provide continuous longitudinally extending outwardly projecting ribs on the outer face thereof between said groups of openings to form a corrugated outer face on said shaving section for causing the skin being shaved to bulge between said ribs into said openings as the head is moved in shaving in a direction transversely, relatively to said ribs, and a longitudinally movable inner cutter having a plurality of transversely extending cutter bars formed with cutting edges on the outer face extending transversely across said shaving section in engagement with the inner face of said shaving section for cutting cooperation therewith in longitudinal reciprocation of said inner cutter.

5. A shaver head comprising an outer cutter formed to provide a shaving section and side sections extending from opposite sides of and supporting said shaving section, said shaving section having a plurality of spaced groups of apertures extending from the outer to the inner faces thereof and forming cutting edges at the inner face, said shaving section having the outer face formed with a plurality of outwardly projecting ribs extending continuously between opposite edges, arranged in spaced relation to each other and interspersed with said groups of apertures to form a corrugated outer face, said ribs causing bulging of the skin therebetween when the outer surface of said head is applied to the skin wherein the bulged portions of the skin are projected into said openings during shaving, and a movable inner cutter having cutting edges thereon engaged with the inner surface of said shaving section for cutting cooperation with the cutting edges on said shaving section during reciprocation thereof relative to said outer cutter.

JAMES HENRY RAND, Jr.
ALBERT MILLER ROSS.